United States Patent
Kim et al.

(10) Patent No.: US 9,589,728 B2
(45) Date of Patent: Mar. 7, 2017

(54) MULTILAYER CERAMIC CAPACITOR AND BOARD FOR MOUNTING THE SAME

(71) Applicant: SAMSUNG ELECTRO-MECHANICS CO., LTD., Suwon, Gyunggi-do (KR)

(72) Inventors: Yu Na Kim, Gyunggi-do (KR); Jae Yeol Choi, Gyunggi-do (KR); Jong Ho Lee, Gyunggi-do (KR); Sang Huk Kim, Gyunggi-do (KR); Doo Young Kim, Gyunggi-do (KR); Sung Woo Kim, Gyunggi-do (KR)

(73) Assignee: SAMSUNG ELECTRO-MECHANICS CO., LTD., Suwon, Gyunggi-Do (KR)

( * ) Notice: Subject to any disclaimer, the term of this patent is extended or adjusted under 35 U.S.C. 154(b) by 539 days.

(21) Appl. No.: 14/088,049

(22) Filed: Nov. 22, 2013

(65) Prior Publication Data
US 2014/0360764 A1    Dec. 11, 2014

(30) Foreign Application Priority Data

Jun. 10, 2013    (KR) .................. 10-2013-0066038

(51) Int. Cl.
*H01G 4/228* (2006.01)
*H01G 4/06* (2006.01)
(Continued)

(52) U.S. Cl.
CPC .............. *H01G 4/30* (2013.01); *H01G 2/065* (2013.01); *H01G 4/012* (2013.01); *H01G 4/232* (2013.01); *H01G 4/12* (2013.01)

(58) Field of Classification Search
CPC ........ H01G 4/30; H01G 4/232; H01G 4/1227; H01G 4/228
(Continued)

(56) References Cited

U.S. PATENT DOCUMENTS 4,814,940 A † 3/1989 Horstmann
5,569,880 A † 10/1996 Galvagni
(Continued)

FOREIGN PATENT DOCUMENTS

| JP | 10-289837 A | 10/1998 |
| JP | 11-297566 A | 10/1999 |
| JP | 2012054330 A | 3/2012 |

*Primary Examiner* — Eric Thomas
*Assistant Examiner* — Arun Ramaswamy
(74) *Attorney, Agent, or Firm* — McDermott Will & Emery LLP

(57) ABSTRACT

A multilayer ceramic capacitor includes a ceramic body including dielectric layers; first and second internal electrode groups disposed to be misaligned by a predetermined interval in the length direction, having the dielectric layers interposed therebetween; first and second external electrodes extended from at least one of the first and second side surfaces to at least one of the first and second main surfaces; and an insulating layer covering portions of the first and second external electrodes formed on the at least one of the first and second side surfaces, wherein the first internal electrode group includes first and second internal electrodes including first and second pattern parts and first and second lead parts, respectively, and the second internal electrode group includes third and fourth internal electrodes including third and fourth pattern parts and third and fourth lead parts, respectively.

24 Claims, 11 Drawing Sheets

(51) Int. Cl.
  *H01G 4/30* (2006.01)
  *H01G 4/12* (2006.01)
  *H01G 4/232* (2006.01)
  *H01G 2/06* (2006.01)
  *H01G 4/012* (2006.01)

(58) Field of Classification Search
  USPC ............ 361/301.4, 303, 321.1, 321.2, 306.1
  See application file for complete search history.

(56) References Cited

U.S. PATENT DOCUMENTS 6,385,034 B2 * 5/2002 Tanaka .................... H01C 1/14
  361/306.1
6,496,355 B1 * 12/2002 Galvagni ............... H01G 4/232
  361/306.3

\* cited by examiner
† cited by third party

MULTILAYER CERAMIC CAPACITOR AND BOARD FOR MOUNTING THE SAME

CROSS-REFERENCE TO RELATED APPLICATION

This application claims the benefit of Korean Patent Application No. 10-2013-0066038 filed on Jun. 10, 2013, with the Korean Intellectual Property Office, the disclosure of which is incorporated herein by reference.

BACKGROUND OF THE INVENTION

Field of the Invention

The present invention relates to a multilayer ceramic capacitor and a board for mounting the same.

Description of the Related Art

In general, electronic components using a ceramic material, such as a capacitor, an inductor, a piezoelectric element, a varistor, a thermistor, or the like, include a ceramic body formed of a ceramic material, internal electrodes formed in the ceramic body, and external electrodes mounted on surfaces of the ceramic body so as to be connected to the internal electrodes.

Among ceramic electronic components, a multilayer ceramic capacitor includes a plurality of laminated dielectric layers, internal electrodes disposed to face each other, each pair of internal electrodes having one of the dielectric layers interposed therebetween, and external electrodes electrically connected to the internal electrodes.

The multilayer ceramic capacitor provides advantages of compactness, high capacitance, and ease of mounting, so it is therefore extensively used in mobile communication devices such as notebook computers, personal digital assistances (PDAs), mobile phones, or the like.

Recently, as electronic products have been miniaturized and multi-functionalized, chip components have also tended to be miniaturized and highly functionalized. Therefore, there is a need to miniaturize the multilayer ceramic capacitor and increase the capacitance thereof.

In addition, the multilayer ceramic capacitor has been usefully used as a bypass capacitor disposed in a large-scale integration (LSI) power supply circuit. The multilayer ceramic capacity needs to have capability to effectively remove high frequency noise in order to serve as the bypass capacitor. This demand has been further increased in accordance with the trend toward electronic devices having high frequencies. The multilayer ceramic capacitor used as the bypass capacitor may be electrically connected to amounting pad on a circuit board through soldering, and the mounting pad may be connected to other external circuits through wiring patterns on, or conductive vias in, the circuit board.

RELATED ART DOCUMENT (Patent Document 1) Japanese Patent Laid-Open Publication No. 1998-289837

SUMMARY OF THE INVENTION

An aspect of the present invention provides a multilayer ceramic capacitor and a board for mounting the same.

According to an aspect of the present invention, there is provided a multilayer ceramic capacitor including: a ceramic body including dielectric layers and having first and second main surfaces facing each other in a thickness direction thereof, first and second end surfaces facing each other in a length direction thereof, and first and second side surfaces facing each other in a width direction thereof; first and second internal electrode groups disposed to be misaligned by a predetermined interval in the length direction, having the dielectric layers interposed therebetween; first and second external electrodes extended from at least one of the first and second side surfaces of the ceramic body to at least one of the first and second main surfaces thereof; and an insulating layer covering portions of the first and second external electrodes formed on the at least one of the first and second side surfaces, wherein the first internal electrode group includes a first internal electrode including a first pattern part and a first lead part connected to the first external electrode and a second internal electrode including a second pattern part and a second lead part connected to the second external electrode, and the second internal electrode group includes a third internal electrode including a third pattern part and a third lead part connected to the first external electrode and a fourth internal electrode including a fourth pattern part and a fourth lead part connected to the second external electrode.

The first internal electrode group may be disposed adjacently to the first end surface of the ceramic body, and the second internal electrode group may be disposed adjacently to the second end surface of the ceramic body.

Portions of the first and third lead parts connected to the first external electrode may be aligned with each other.

Portions of the second and fourth lead parts connected to the second external electrode may be aligned with each other.

The second lead part may be disposed obliquely to the second pattern part.

The third lead part may be disposed obliquely to the third pattern part.

The first and second external electrodes may be extended from the first side surface to any one of the first and second main surfaces.

The first and second external electrodes may be extended from the first side surface to the first and second main surfaces.

The first and second external electrodes may be extended from the first side surface to any one of the first and second main surfaces, and the second side surface.

The first and second external electrodes may be extended from the first side surface to the first and second main surfaces and the second side surface.

The first external electrode may be extended from the first side surface to the first main surface, and the second external electrode may be extended from the second side surface to the first main surface.

The first and second external electrodes may be disposed to contact the first and second end surfaces.

The first and second external electrodes may be spaced apart from the first and second end surfaces by a predetermined interval.

The insulating layer may include an organic resin, ceramic, an inorganic filler, glass, or a mixture thereof.

The first and second internal electrodes may be disposed horizontally to a mounting surface of the ceramic body.

The dielectric layers may have an average thickness of 0.1 μm to 2.0 μm.

The first and second internal electrodes may have a thickness of 1.5 μm or less.

According to another aspect of the present invention, there is provided a board for mounting a multilayer ceramic capacitor, the board including: a printed circuit board having first and second electrode pads formed thereon; and a multilayer ceramic capacitor mounted on the printed circuit board, wherein the multilayer ceramic capacitor includes: a ceramic body including dielectric layers and having first and second main surfaces facing each other in a thickness direction thereof, first and second end surfaces facing each other in a length direction thereof, and first and second side surfaces facing each other in a width direction thereof; first and second internal electrode groups disposed to be misaligned by a predetermined interval in the length direction, having the dielectric layers interposed therebetween; first and second external electrodes extended from at least one of the first and second side surfaces of the ceramic body to at least one of the first and second main surfaces; and an insulating layer covering portions of the first and second external electrodes formed on the at least one of the first and second side surfaces, the first internal electrode group including a first internal electrode including a first pattern part and a first lead part connected to the first external electrode and a second internal electrode including a second pattern part and a second lead part connected to the second external electrode, and the second internal electrode group including a third internal electrode including a third pattern part and a third lead part connected to the first external electrode and a fourth internal electrode including a fourth pattern part and a fourth lead part connected to the second external electrode.

One of the first and second main surfaces to which the first and second external electrodes are extended may serve as a mounting surface facing the printed circuit board.

The first internal electrode group may be disposed adjacently to the first end surface of the ceramic body, and the second internal electrode group may be disposed adjacently to the second end surface of the ceramic body.

Portions of the first and third lead parts connected to the first external electrode may be aligned with each other.

Portions of the second and fourth lead parts connected to the second external electrode may be aligned with each other.

The second lead part may be disposed obliquely to the second pattern part.

The third lead part may be disposed obliquely to the third pattern part.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
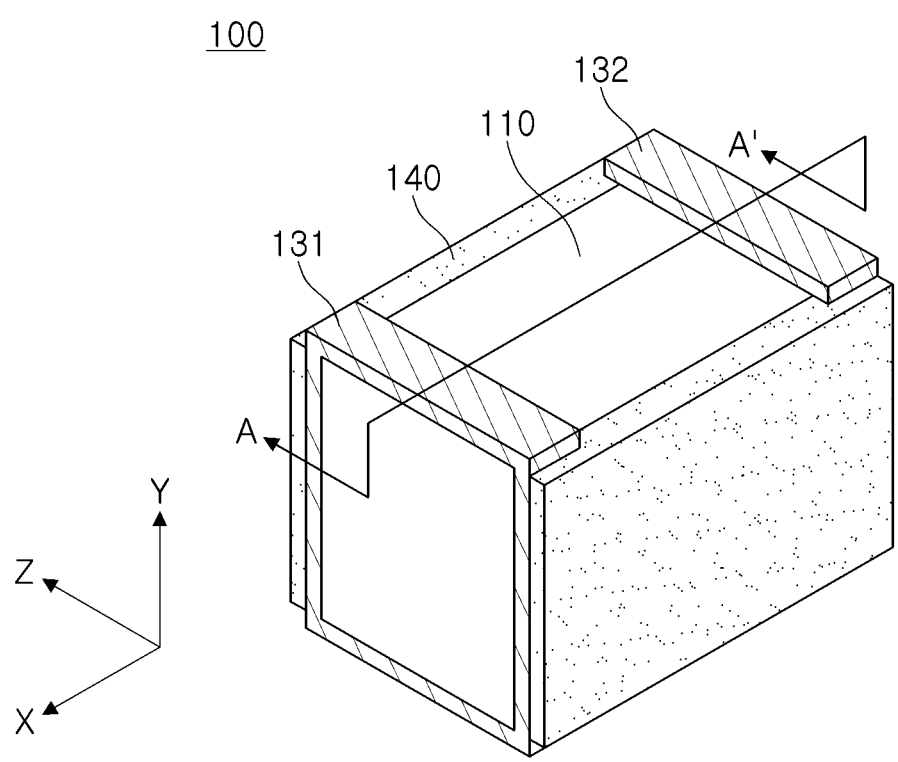
FIG. 1 is a schematic perspective view showing a multilayer ceramic capacitor according to an embodiment of the present invention.

Hereinafter, embodiments of the present invention will be described in detail with reference to the accompanying drawings.

The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions of elements may be exaggerated for clarity, and the same reference numerals will be used throughout to designate the same or like elements.

Multilayer Ceramic Capacitor

According to an embodiment of the invention, there is provided a multilayer ceramic capacitor 100 including: a ceramic body 110 including dielectric layers 111 and having first and second main surfaces 5 and 6 facing each other in a thickness direction thereof, first and second end surfaces 3 and 4 facing each other in a length direction thereof, and first and second side surfaces 1 and 2 facing each other in a width direction thereof; first and second internal electrode groups I and II disposed to be misaligned by a predetermined interval in the length direction, having the dielectric layers 111 interposed therebetween; first and second external electrodes 131 and 132 extended from at least one of the first and second side surfaces of the ceramic body to at least one of the first and second main surfaces; and an insulating layer 140 covering portions of the first and second external electrodes formed on the at least one of the first and second side surfaces, wherein the first internal electrode group includes a first internal electrode 121 including a first pattern part 121a and a first lead part 121b connected to the first external electrode 131 and a second internal electrode 122 including a second pattern part 122a and a second lead part 122b connected to the second external electrode 132, and the second internal electrode group includes a third internal electrode 123 including a third pattern part 123a and a third lead part 123b connected to the first external electrode 131 and a fourth internal electrode 124 including a fourth pattern part 124a and a fourth lead part 124b connected to the second external electrode 132.

Hereinafter, embodiments of the invention will be described in detail with reference to the accompanying drawings.

Figure 2A:
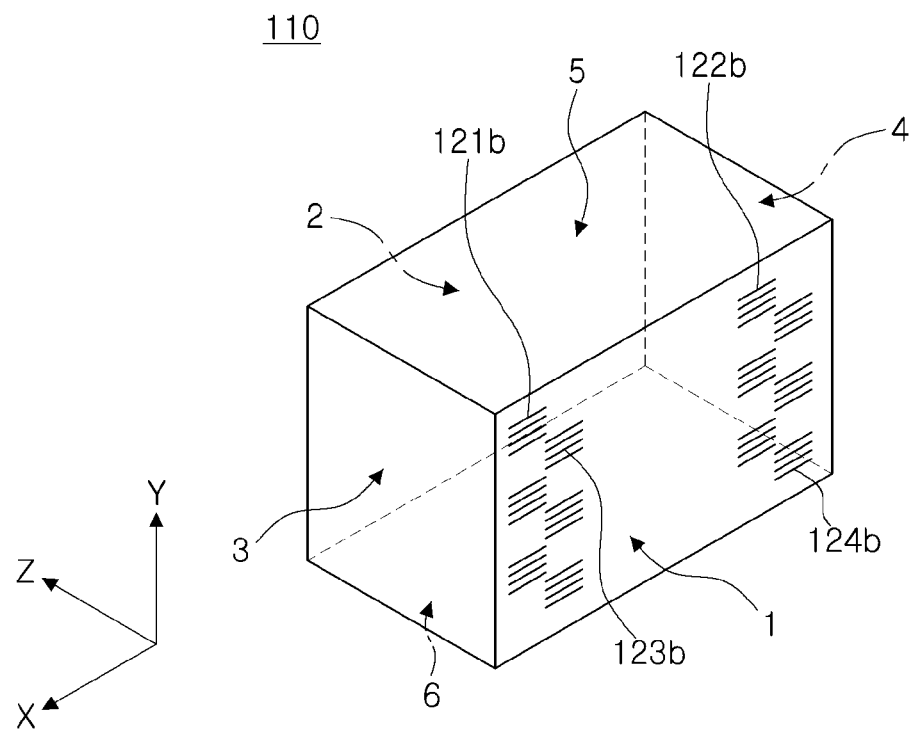
FIGS. 2A and 2B are schematic perspective views showing a ceramic body of a multilayer ceramic capacitor according to embodiments of the present invention.
Figure 2B:
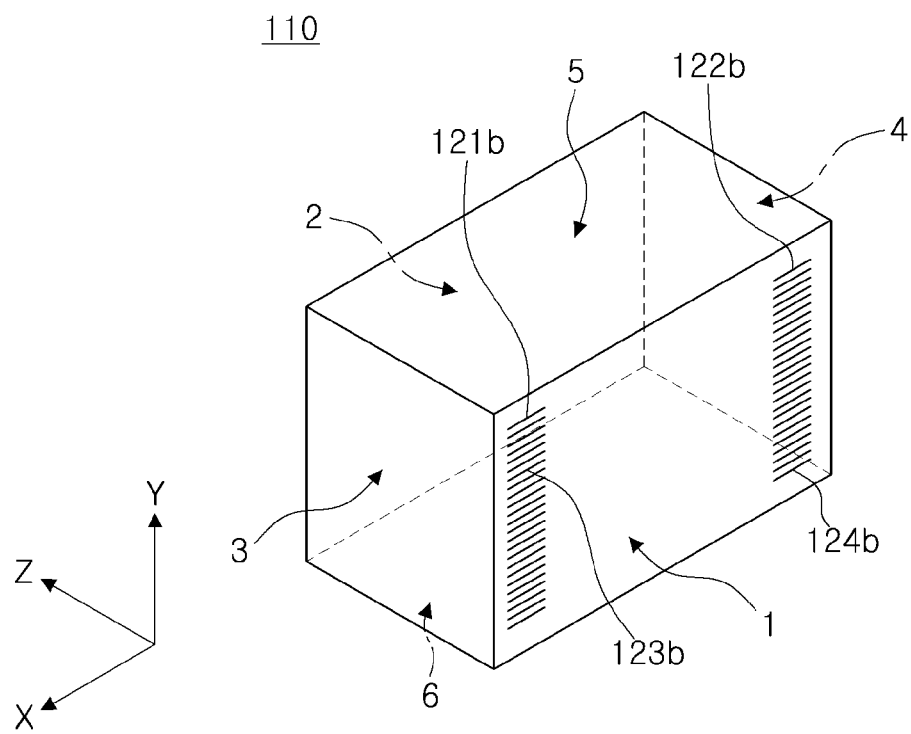
Figure 3:
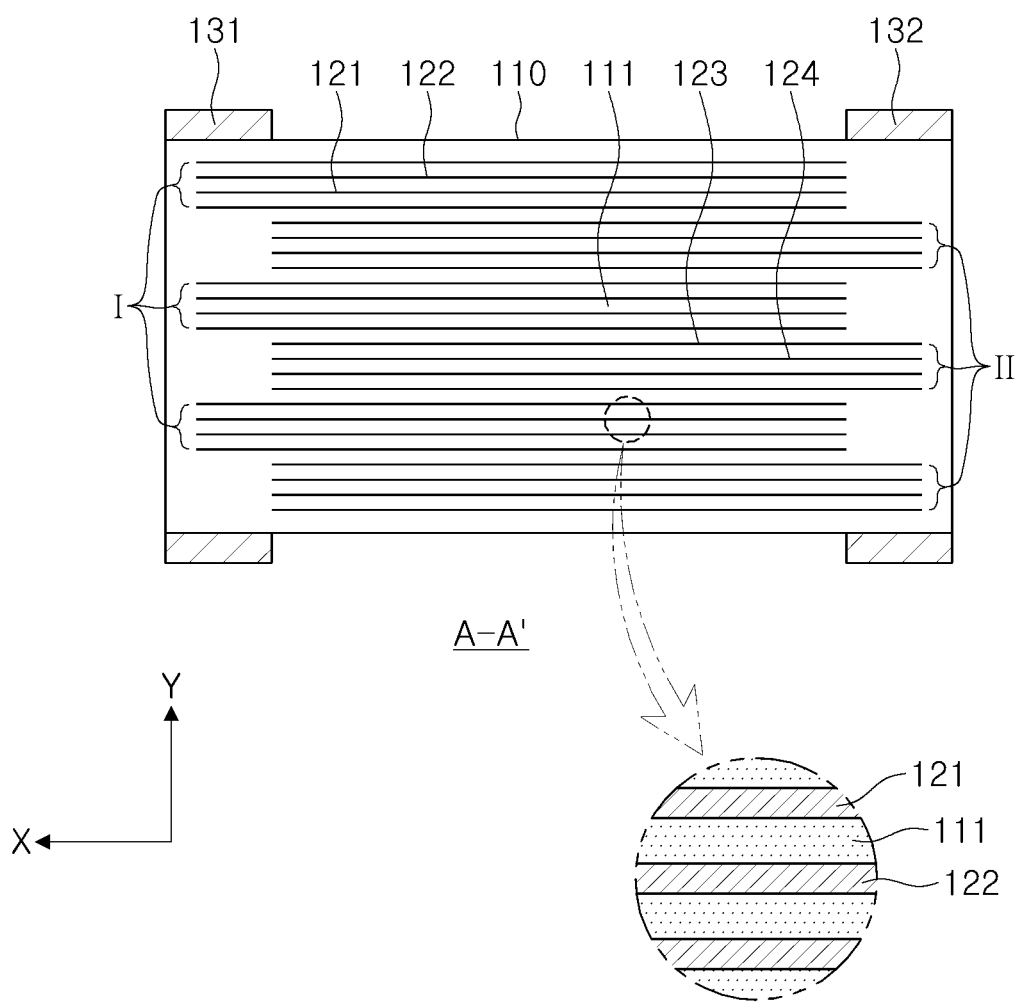
FIG. 3 is a cross-sectional view taken along line A-A' of FIG. 1.

FIG. 1 is a schematic perspective view showing a multilayer ceramic capacitor according to an embodiment of the invention, FIGS. 2A and 2B are schematic perspective views showing a ceramic body of a multilayer ceramic capacitor according to embodiments of the invention, and FIG. 3 is a cross-sectional view taken along line A-A' of FIG. 1.

Referring to FIG. 1, the multilayer ceramic capacitor 100 according to the embodiment of the present invention may include the ceramic body 110; the first and second external electrodes 131 and 132; and the insulating layer 140.

Referring to FIGS. 2A and 2B, the ceramic body 110 may have the first and second main surfaces 5 and 6 facing each other in the thickness direction, the first and second side surfaces 1 and 2 facing each other in the width direction and connecting the first and second main surfaces to each other, and the first and second end surfaces 3 and 4 facing each other in the length direction and connecting the first and second main surfaces to each other.

A shape of the ceramic body 110 is not particularly limited, but may be hexahedral as shown. At the time of sintering a chip, due to sintering shrinkage of ceramic powders, the ceramic body 110 may not have a hexahedral shape with complete straight lines, but may have a substantial hexahedral shape.

As shown in FIG. 3, the ceramic body 110 may include a plurality of dielectric layers 111, the first internal electrode group I including the first and second internal electrodes 121 and 122 individually formed on the dielectric layers 111, and the second internal electrode group II including the third and fourth internal electrodes 123 and 124 individually formed on the dielectric layers 111, and the ceramic body 110 may be formed by stacking the plurality of dielectric layers having the internal electrodes formed thereon.

In addition, the first and second internal electrodes 121 and 122 may be stacked in a y-direction while facing each other, having one dielectric layer 111 interposed therebetween, and the third and fourth internal electrodes 123 and 124 may be stacked in the y-direction while facing each other, having one dielectric layer 111 interposed therebetween.

According to the embodiment of the invention, the y-direction refers to the thickness direction of the ceramic body in which the internal electrodes are stacked, having the dielectric layer interposed therebetween; an x-direction refers to the length direction of the ceramic body; and a z-direction refers to the width direction of the ceramic body.

Here, the 'thickness direction' may be the same as a direction in which dielectric layers are stacked, that is, the 'stacking direction'.

The first and second internal electrode groups I and II may be stacked in the y-direction while facing each other, having one dielectric layer interposed therebetween, but may be disposed to be misaligned in the length direction (x-direction) by a predetermined interval in a cross-section of the ceramic body in a length-thickness (x-y) direction.

That is, the first internal electrode group I may be disposed adjacently to the first end surface of the ceramic body, and the second internal electrode group II may be disposed adjacently to the second end surface of the ceramic body.

In other words, the first and second internal electrode groups I and II may be disposed to be misaligned in the length direction by a predetermined interval to thereby have zigzag-shaped step portions in the cross-section of the ceramic body in the length-thickness (x-y) direction.

As described above, in the case in which the first and second internal electrode groups are misaligned with each other in the length direction so as to have the step portion, overlapped regions of the internal electrodes may be dispersed, whereby acoustic noise may be decreased at the time of mounting the multilayer ceramic capacitor on a printed circuit board.

Hereinafter, a relationship between the multilayer ceramic capacitor and the acoustic noise according to the arrangement of the first and second internal electrode groups will be described with reference to FIG. 3.

Generally, when voltages having different polarities are applied to first and second external electrodes of a multilayer ceramic capacitor, a ceramic body may be expanded and contracted in a thickness direction thereof by an inverse piezoelectric effect of dielectric layers in overlapped regions of internal electrodes, while the ceramic body may be contracted and expanded in a length direction thereof by a poisson effect, contrary to the expansion and contraction of the ceramic body in the thickness direction.

However, in the case in which the internal electrodes are disposed to allow the overlapped regions of the internal electrodes to be misaligned, when the voltages having different polarities are applied to the first and second external electrodes, contraction and expansion of the dielectric layers in the overlapped regions and non-overlapped regions of the internal electrodes may differently occur.

That is, the dielectric layers in the overlapped regions of the internal electrodes may be expanded in the thickness direction of the ceramic body, and the dielectric layers in the non-overlapped regions of the internal electrodes may be contracted in the thickness direction of the ceramic body.

Particularly, as the dielectric layers in the overlapped regions of the internal electrodes are expanded in the thickness direction of the ceramic body, the dielectric layers in the overlapped regions of the internal electrodes are contracted in the length direction of the ceramic body by the poisson effect. In addition, as the dielectric layers in the non-overlapped regions of the internal electrodes are contracted in the thickness direction of the ceramic body, the dielectric layers in the non-overlapped regions of the internal electrodes are expanded in the length direction of the ceramic body by the poisson effect.

According to the embodiment of the invention, as the first and second internal electrode groups I and II are disposed to be misaligned with each other, the overlapped regions of the internal electrodes and the non-overlapped regions of the internal electrodes may be alternately disposed adjacently to the first and second end surfaces of the ceramic body, and the above-mentioned contraction and expansion may alternately occur at the first and second end surfaces of the ceramic body in individual regions of the first and second internal electrode groups.

The contraction and expansion at each region of the first and second end surfaces complementarily occur, such that influences of expansion and contraction capable of generating acoustic noise may offset each other, thereby significantly decrease an influence of the acoustic noise that may be generated at the time of mounting the multilayer ceramic capacitor on the printed circuit board.

The ceramic body 110 may be formed by stacking the plurality of dielectric layers 111 and sintering the same. Here, a shape and a dimension of the ceramic body 110 and the number of stacked dielectric layers 111 are not limited to those illustrated in the present embodiment.

In addition, the plurality of dielectric layers 111 configuring the ceramic body 110 may be in a sintered state. Adjacent dielectric layers 111 may be integrated so that boundaries therebetween are not readily apparent without using a scanning electron microscope (SEM).

According to the embodiment of the invention, an average thickness of the dielectric layer 111 may be optionally changed according to target capacitance of the multilayer ceramic capacitor 100, but may be 0.1 to 2.0 μm after sintering.

The average thickness of the dielectric layer 111 may be measured on an image obtained by scanning the cross-section of the ceramic body 110 using a scanning electron microscope (SEM).

For example, with respect to any dielectric layer randomly extracted from the image obtained by scanning the cross-section of the ceramic body 110 in the width-thickness (y-z) direction cut in a central portion of the ceramic body 110 in the length (x) direction using the scanning electron microscope (SEM), an average thickness of the dielectric layer may be obtained by measuring thicknesses thereof at thirty equidistant points in the width direction and calculating an average value thereof.

The thicknesses at thirty equidistant points may be measured in a capacitance forming part in which the first and second internal electrodes 121 and 122 or the third and fourth internal electrodes 123 and 124 are overlapped with each other.

In addition, when an average thickness of ten or more dielectric layers is measured by the above-mentioned method, the average thickness of the dielectric layer may be further generalized.

The first to fourth internal electrodes 121 to 124 may be formed using a conductive paste formed of at least one of, for example, a noble metal material such as palladium (Pd), a palladium-silver (Pd—Ag) alloy, or the like, nickel (Ni), and copper (Cu), but are not particularly limited thereto.

Meanwhile, the first and second internal electrodes 121 and 122 may be a pair of electrodes having opposite polarities, and the third and fourth internal electrodes 123 and 124 may be a pair of electrodes having opposite polarities. The first and third internal electrodes may have the same polarity, and the second and fourth internal electrodes may have the same polarity. The first to fourth internal electrodes may be formed by printing a conductive paste containing a conductive metal on the dielectric layers 111 at a predetermined thickness.

An average thickness of the first to fourth internal electrodes 121 to 124 after sintering is not particularly limited as long as capacitance is formed. For example, the average thickness of the internal electrode may be 1.5 μm or less.

The average thickness of the first to fourth internal electrodes 121 to 124 may be measured on the image obtained by scanning the cross-section of the ceramic body 110 using the scanning electron microscope (SEM).

For example, with respect to any internal electrode randomly extracted from the image obtained by scanning the cross-section of the ceramic body 110 in the width-thickness (y-z) direction cut in the central portion of the ceramic body 110 in the length (x) direction using the scanning electron microscope (SEM), an average thickness of the internal electrode may be obtained by measuring thicknesses thereof at thirty equidistant points in the width direction and calculating an average value thereof.

The thicknesses at thirty equidistant points may be measured in the capacitance forming part in which the first to fourth internal electrodes 121 to 124 are overlapped with each other.

When an average thickness of ten or more internal electrodes is measured by the above-mentioned method, the average thickness of the internal electrode may be further generalized.

According to the embodiment of the invention, the first to fourth internal electrodes 121 to 124 may be disposed horizontally to amounting surface, that is, the first or second main surface 5 or 6 of the multilayer ceramic capacitor.

Here, the term "first and second" may be used to indicate different polarities, and the term "third and fourth" may be used to indicate different polarities.

Figure 4A:
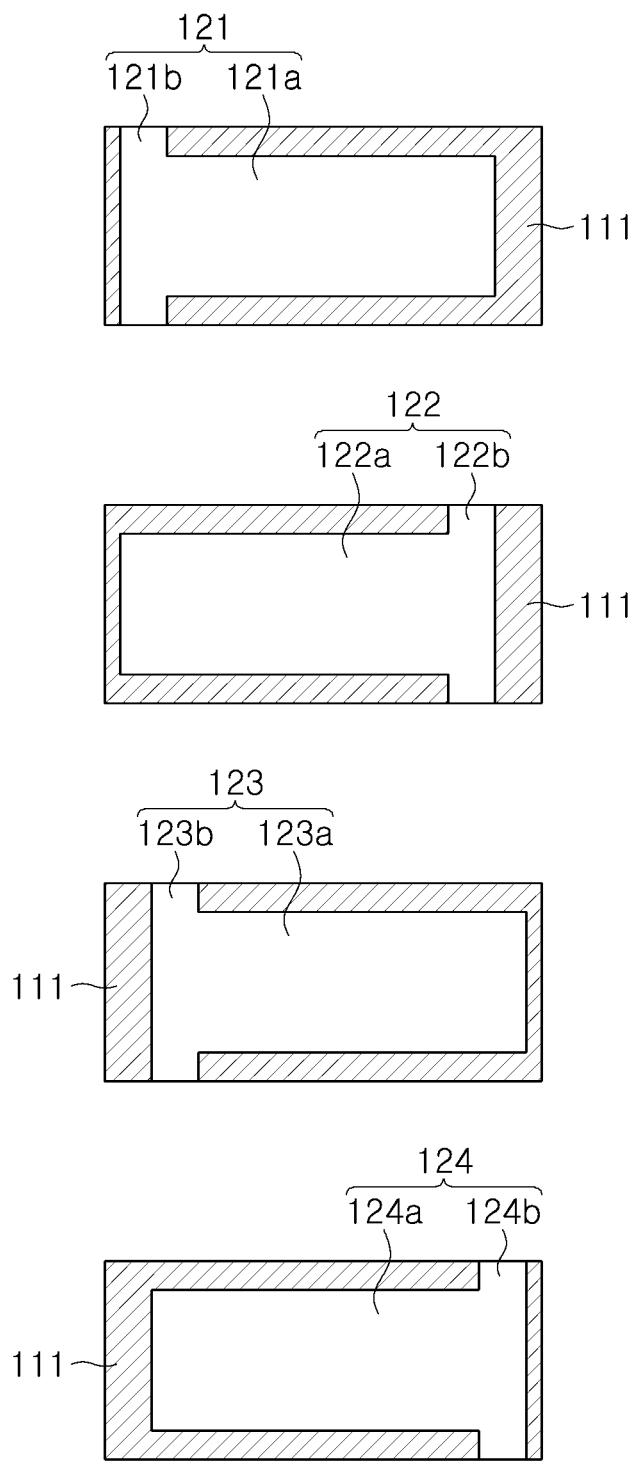
FIGS. 4A and 4B are plan views showing internal electrodes of a multilayer ceramic capacitor according to embodiments of the present invention.
Figure 4B:
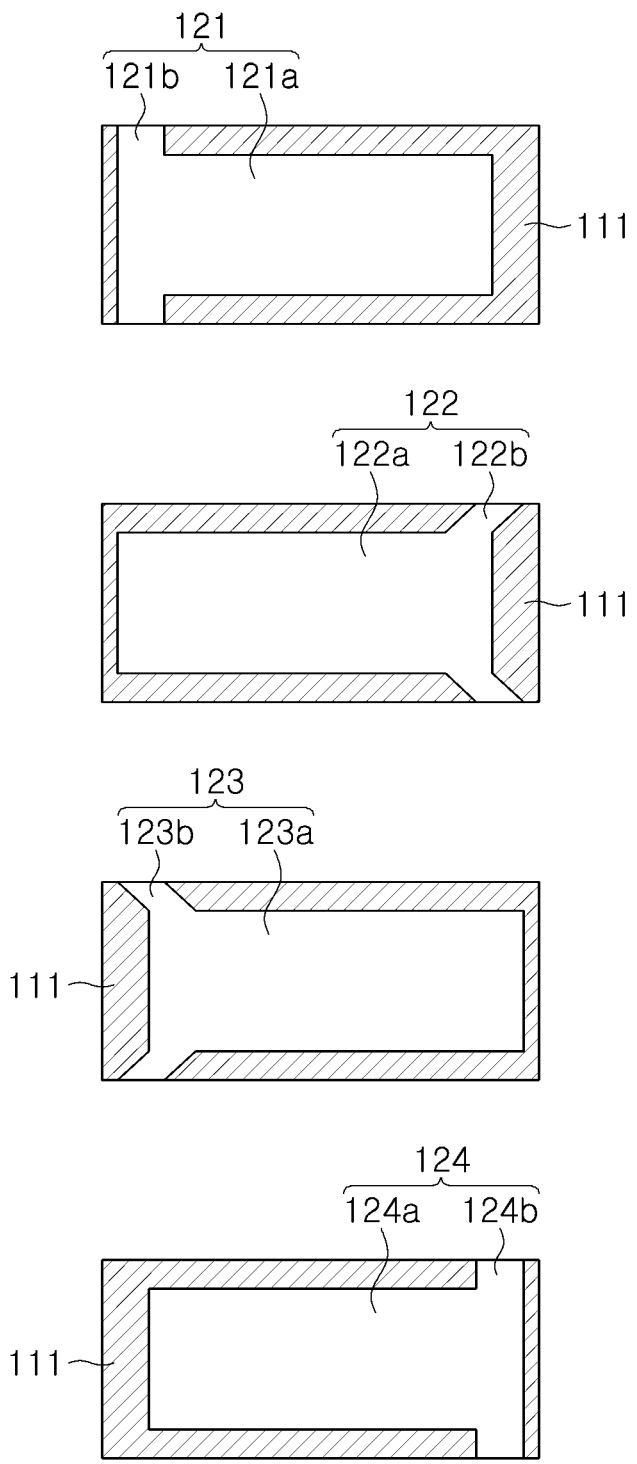

FIGS. 4A and 4B are plan views showing internal electrodes of a multilayer ceramic capacitor according to embodiments of the present invention.

FIG. 4A is a plan view showing the arrangement of first to fourth internal electrodes according to an embodiment of the invention.

Referring to FIG. 4A, the first internal electrode 121 may include the first pattern part 121a for forming capacitance and the first lead part 121b for securing electrical connection to the first external electrode 131, and the second internal electrode 122 may include the second pattern part 122a for forming capacitance and the second lead part 122b for securing electrical connection to the second external electrode 132.

In addition, the third internal electrode 123 may include the third pattern part 123a for forming capacitance and the third lead part 123b for securing electrical connection to the first external electrode 131, and the fourth internal electrode 124 may include the fourth pattern part 124a for forming capacitance and the fourth lead part 124b for securing electrical connection to the second external electrode 132.

The first to fourth lead parts 121b to 124b may be exposed to at least one of the first and second side surfaces of the ceramic body so as to be connected to the external electrode. That is, each of the first to fourth lead parts may be exposed to the first side surface, the second side surface, or both of the first and second side surfaces and may be selectively exposed so as to be suitable for formation positions of the first and second external electrodes.

The first to fourth lead parts may be formed to be vertical to the first to fourth pattern parts, respectively. In the case in which the first to fourth lead parts may be formed vertically to the first to fourth pattern parts, respectively, as shown in FIG. 2A, portions of the first and third lead parts exposed to at least one of the first and second side surfaces of the ceramic body may be misaligned with each other, and portions of the second and fourth lead parts exposed to at least one of the first and second side surfaces of the ceramic body may be misaligned with each other.

FIG. 4B is a plan view showing the arrangement of first to fourth internal electrodes according to another embodiment of the invention. Overlap descriptions between the present embodiment of FIG. 4B, and the previous embodiment of FIG. 4A will be omitted, and differences therebetween will be mainly described.

Referring to FIG. 4B, first and third lead parts 121b and 123b may be formed such that portions of the first and third lead parts exposed to at least one of the first and second side surfaces of the ceramic body are aligned with each other, and second and fourth lead parts 122b and 124 b may be formed such that portions of the second and fourth lead parts exposed to at least one of the first and second side surfaces of the ceramic body are aligned with each other, as shown in FIG. 2B.

Particularly, in the case in which the first lead part is formed vertically to the first pattern part, the third lead part may be formed obliquely to the third pattern part, such that the exposed portions of the first and third lead parts may be aligned with each other, and in the case in which the second lead part is formed obliquely to the second pattern part, the fourth lead part may be formed vertically to the fourth pattern part, such that the exposed portions of the second and fourth lead parts may be aligned with each other.

As described above, when the exposed portions of the first and third lead parts are formed to be aligned with each other, even in the case that the first and third internal electrodes are disposed to alternate with each other, there may be no need to increase a width of the first external electrode.

Similarly, when the exposed portions of the second and fourth lead parts are formed to be aligned with each other, even in the case that the second and fourth internal electrodes are disposed to alternate with each other, there may be no need to increase a width of the second external electrode.

That is, according to the present embodiment, even in the case in which the internal electrodes having the same polarity are disposed to alternate with each other in the length direction, the widths of the external electrodes may not be increased, but the external electrodes having the same width as that of the external electrodes applicable to the case in which the internal electrodes having the same polarity are disposed so as not to alternate with each other may be employed.

Further, although not shown, the first and third lead parts and the second and fourth lead parts may be exposed to the different side surfaces of the ceramic body. That is, the first and third lead parts may be exposed to the first side surface, and the second and fourth lead parts may be exposed to the second side surface.

The first to fourth internal electrodes 121 to 124 may be electrically insulated from one another by the dielectric layers 111 disposed thereamong.

That is, the first to fourth internal electrodes 121 to 124 may be electrically connected to the first and second external electrodes 131 and 132 via the first to fourth lead parts 121b to 124b exposed to the side surfaces of the ceramic body, respectively.

Therefore, when voltage is applied to the first and second external electrodes 131 and 132, electric charges are accumulated between the first and second internal electrodes 121 and 122 facing each other or third and fourth internal electrodes 123 and 124 facing each other. In this case, capacitance of the multilayer ceramic capacitor 100 may be in proportion to an area of an overlapped region of the internal electrodes.

FIGS. 5A through 5G are perspective views showing a ceramic body and external electrodes of a multilayer ceramic capacitor according to an embodiment of the present invention.

Referring to FIGS. 5A through 5G, the first external electrode 131 may be formed to be connected to the first and third internal electrodes 121 and 123, and the second external electrode 132 may be formed to be connected to the second and fourth internal electrodes 122 and 124.

The first external electrode 131 may be electrically connected to the first and third internal electrodes and extended from the first or second side surface on which electrical connection thereamong is made to at least one of the first and second main surfaces and the first and second side surfaces, and the second external electrode 132 may be electrically connected to the second and fourth internal electrode and extended from the first or second side surface on which electrical connection thereamong is made to at least one of the first and second main surfaces and the first and second side surfaces.

Figure 5A:
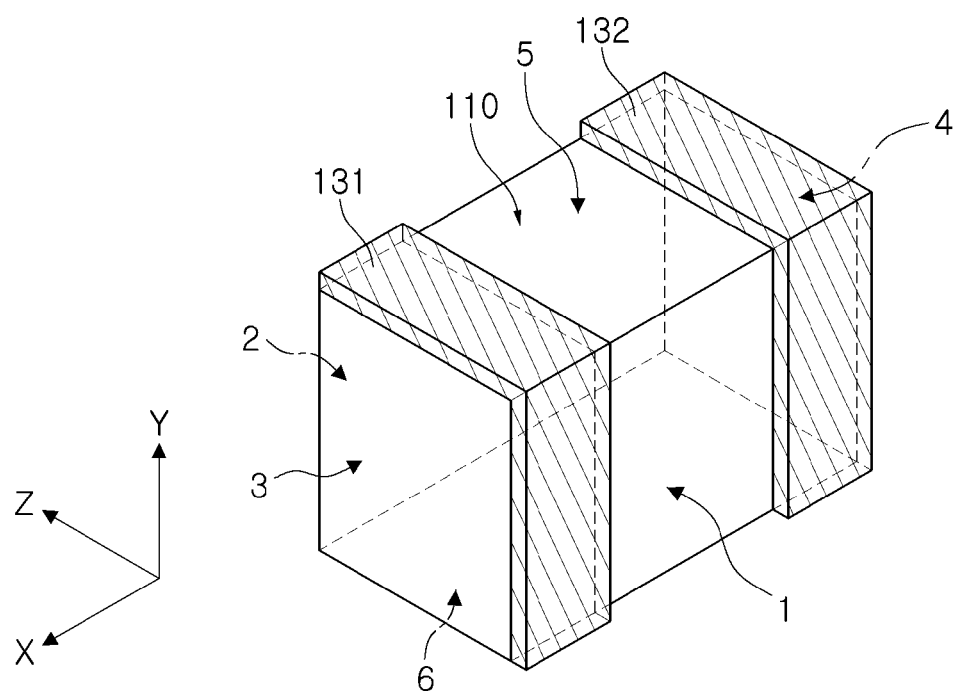
FIGS. 5A through 5G are perspective views showing a ceramic body and external electrodes of a multilayer ceramic capacitor according to embodiments of the present invention.
Figure 5B:
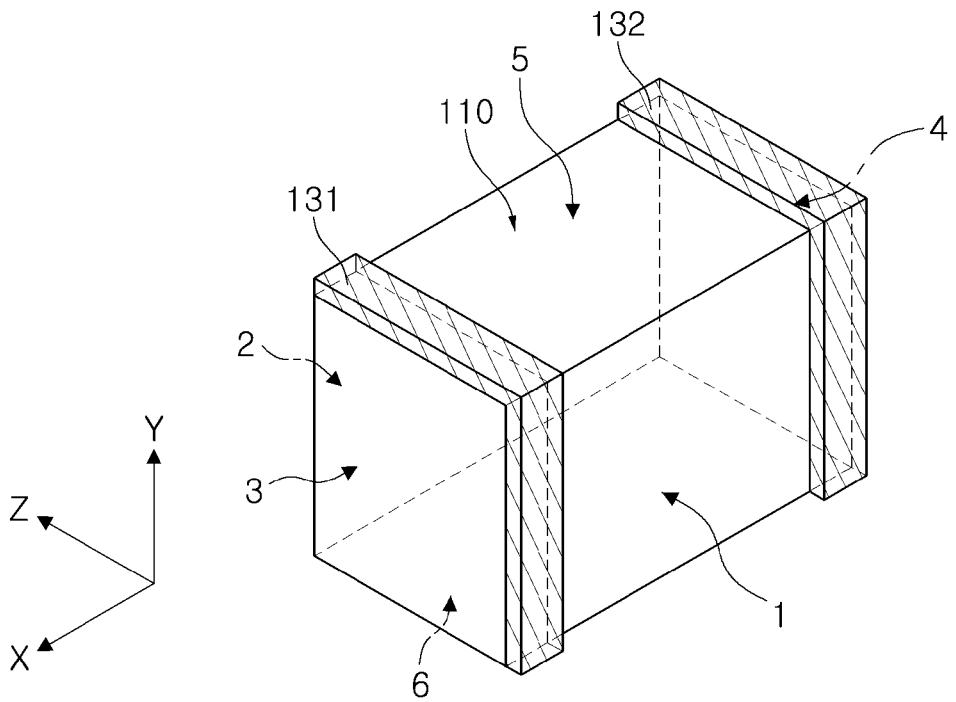
Figure 5C:
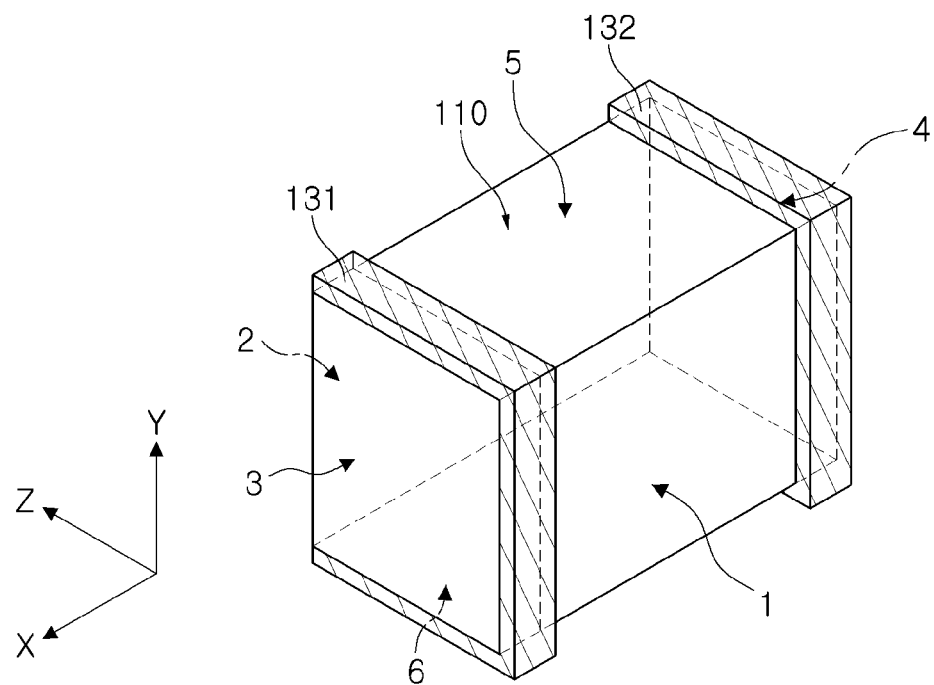

FIG. 5A shows the first and second external electrodes in the case in which the internal electrodes are formed as illustrated in the embodiment of FIG. 4A. In the case of the embodiment of FIG. 4A, since the lead parts of the internal electrodes having the same polarity have non-aligned exposed portions, the widths of the external electrodes may be increased as shown in FIG. 5A.

FIGS. 5B through 5F show that the external electrodes are extended to have various shapes.

Figure 5D:
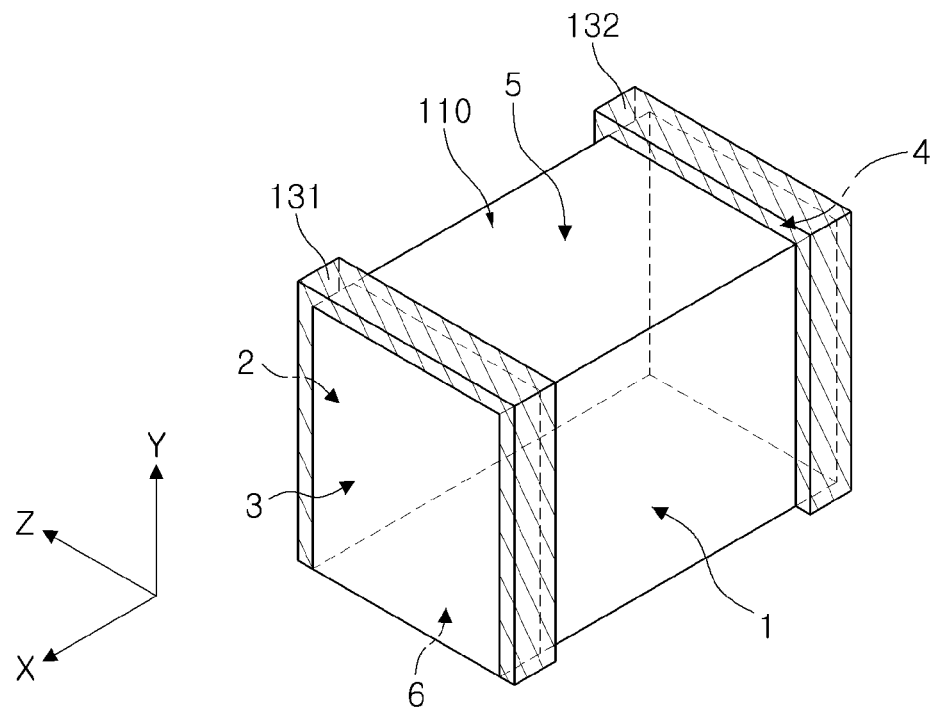

More specifically, the first and second external electrodes 131 and 132 may be extended from the first side surface to any one of the first and second main surfaces (FIG. 5B), to the first and second main surfaces (FIG. 5C), or to any one of the first and second main surfaces and the second side surface (FIG. 5D).

Figure 5E:
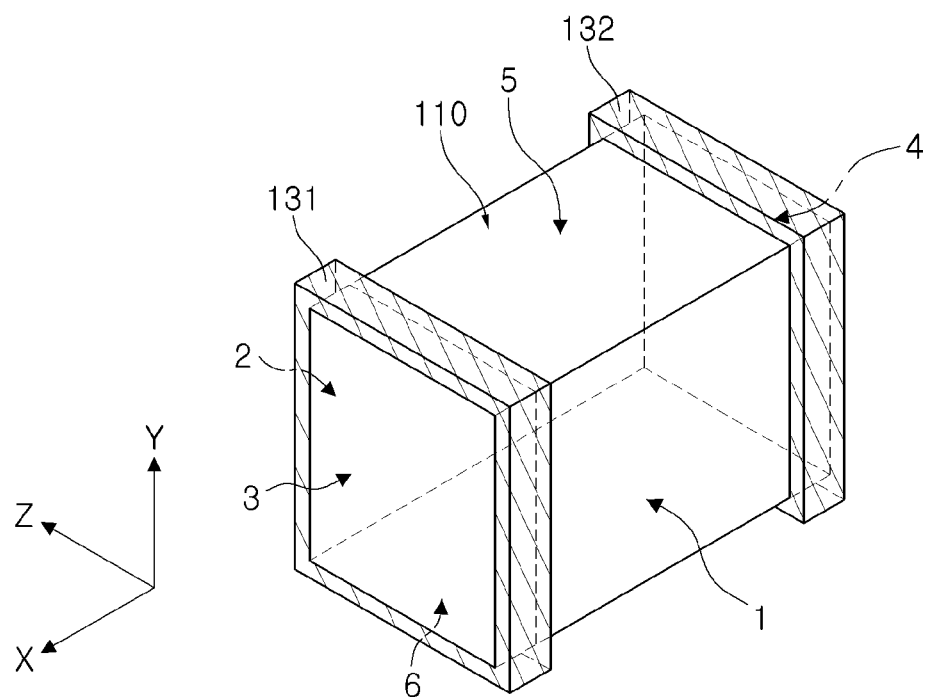

The first and second external electrodes 131 and 132 may be extended from the first side surface to the first and second main surfaces and the second side surface. In this case, the first and second external electrodes may have a "□" shape (FIG. 5E).

Figure 5F:
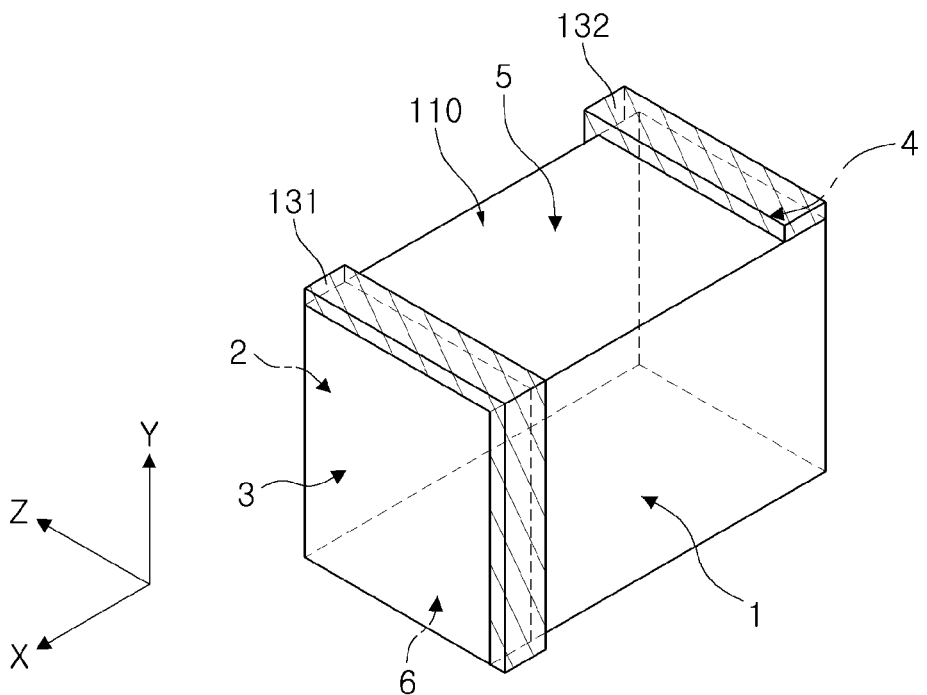

In addition, the first and second external electrodes 131 and 132 may be formed on different side surfaces from each other and extended to the same main surface. For example, the first external electrode 131 may be formed on the first side surface and extended to the first main surface, and the second external electrode 132 may be formed on the second side surface and extended to the first main surface (FIG. 5F).

Figure 5G:
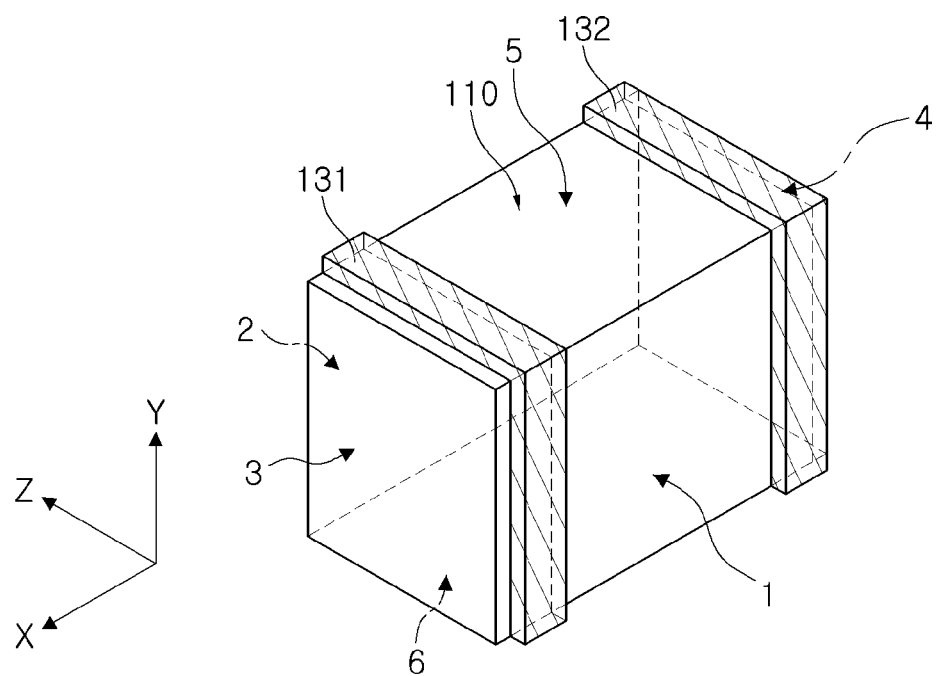

In addition, the first and second external electrodes may be extended from at least one of the first and second side surfaces to at least one of the first and second main surfaces while contacting the first and second end surfaces or being spaced apart from the first and second end surfaces by a predetermined interval (FIG. 5G).

The above-described shapes of the external electrodes are not particularly limited, but may be appropriately changed. However, in order to allow the internal electrodes to be horizontally disposed on the mounting surface, the external electrodes may be extended to at least one of the first and second main surfaces of the ceramic body.

The first and second external electrodes 131 and 132 may be formed of the same conductive material as that of the internal electrodes, but are not limited thereto. For example, the first and second external electrodes 131 and 132 may be formed of copper (Cu), silver (Ag), nickel (Ni), or the like.

The first and second external electrodes 131 and 132 may be formed by applying a conductive paste prepared by adding glass frit to metal powder, and then sintering the conductive paste.

Figure 6:
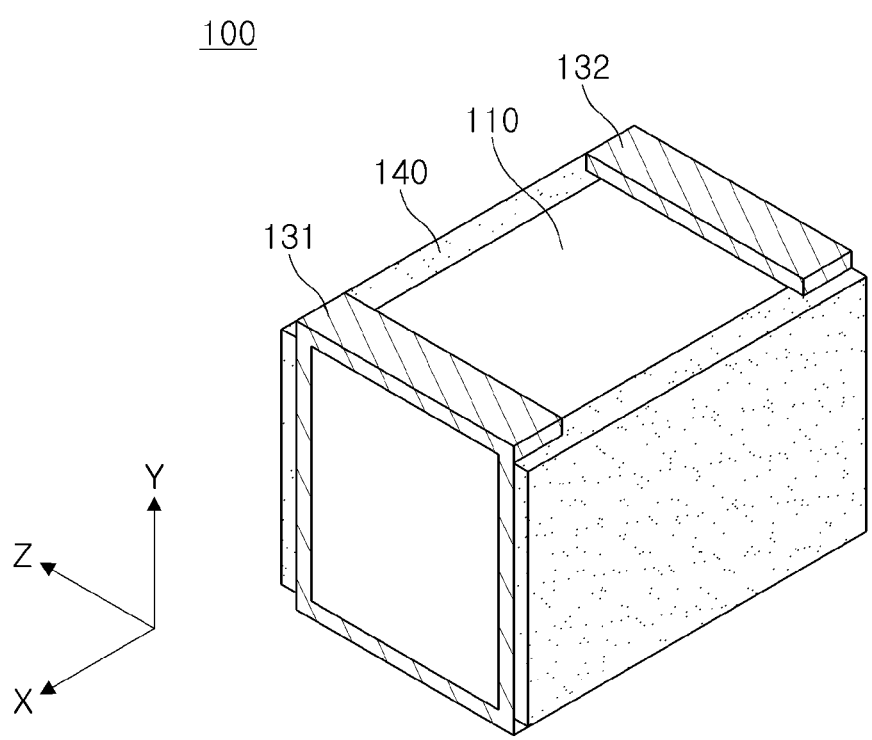
FIG. 6 is a perspective view showing a ceramic body, external electrodes, and an insulating layer of a multilayer ceramic capacitor according to an embodiment of the present invention.

FIG. 6 is a perspective view showing a ceramic body, external electrodes, and an insulating layer of a multilayer ceramic capacitor according to an embodiment of the present invention.

Meanwhile, according to the embodiment of the invention, the insulating layer 140 may be formed to cover portions of the first and second external electrodes 131 and 132 formed on the first and second side surfaces of the ceramic body 110.

Further, as shown in FIG. 6, the insulating layer 140 may be formed so as to cover the portions of the first and second external electrodes formed on the first and second side surfaces while covering the first and second side surfaces.

That is, the insulating layer may cover the portions of the external electrodes formed on the first and second side surfaces, and the external electrodes may be extended to the first or second main surface such that the first or second main surface may serve as a mounting surface. In the case in which the first or second main surface serves as the mounting surface, the internal electrodes may be disposed horizontally to the mounting surface.

Since the dielectric layers have piezoelectric and electrostrictive properties, when direct current (DC) or alternate current (AC) voltage is applied to the multilayer ceramic capacitor, a piezoelectric phenomenon may occur between the internal electrodes, causing vibrations.

The vibrations may be transferred to a printed circuit board on which the multilayer ceramic capacitor is mounted through a solder connected to the multilayer ceramic capacitor, such that the entire printed circuit board may serve as an acoustic reflective surface to generate vibrating sound as noise.

The vibrating sound may correspond to sound within an audible frequency range of 20 to 20000 Hz, and this vibrating sound, potentially providing unpleasant feeling to listeners is known as acoustic noise.

In the case in which the internal electrodes and the dielectric layers of the multilayer ceramic capacitor are disposed vertically to the mounting surface (board), the above-described vibrations may be more easily transferred to the printed circuit board as compared to a case in which the internal electrodes and the dielectric layers are disposed horizontally to the mounting surface. Therefore, the internal electrodes and the dielectric layers disposed horizontally to the mounting surface are advantageous to decrease the acoustic noise. However, in the case in which the lead parts of the internal electrodes are exposed to the same surface of the ceramic body in order to increase capacitance and improve mounting density, the dielectric layers and the internal electrodes are disposed vertically to the mounting surface. According to the embodiment of the invention, the external electrodes are extended to at least one of the first and second main surfaces to allow the first or second main surface to serve as the mounting surface, such that the internal electrodes and the dielectric layers can be disposed horizontally to the mounting surface.

In addition, the acoustic noise is closely associated with the position of the solder at the time of mounting the multilayer ceramic capacitor on the board. As an amount of solder formed on a surface of the multilayer ceramic capacitor vertical to the mounting surface is increased, the vibrations due to the piezoelectric phenomenon may be more easily transferred to the printed circuit board, such that the acoustic noise may be increased. Therefore, a reduction in the amount of solder formed on the surface of the multilayer ceramic capacitor vertical to the mounting surface is advantageous to decrease the acoustic noise.

The solder disposed on the mounting surface may move up to the surface of the multilayer ceramic capacitor vertical to the mounting surface along the external electrodes by surface tension. However, in the embodiment of the invention, portions of the external electrodes exposed to the surface of the multilayer ceramic capacitor vertical to the mounting surface are covered by the insulating layer, such that the solder may not move up or slightly move up, whereby the acoustic noise may be significantly decreased.

Further, although not shown, the insulating layer may not cover the entirety of the first and second side surfaces of the ceramic body, but may be formed to have a predetermined height from the mounting surface of the ceramic body mounted on the board. Since the insulating layer 140 is provided to prevent the solder from moving up the surface of the ceramic body vertical to the mounting surface (the first or second main surface) of the ceramic body, the insulating layer may be provided to have a predetermined height from the mounting surface, and the amount of a material forming the insulating layer may be decreased, thereby reducing the cost.

Further, the insulating layer may be formed to be spaced apart from the mounting surface of the ceramic body by a predetermined interval. In the case in which the insulating layer is formed to be spaced apart from the mounting surface by a predetermined interval, the solder may slightly move up along the external electrodes that are not covered by the insulating layer, but adhesion strength may be rather improved. Therefore, the insulating layer may be formed to be spaced apart from the mounting surface by a predetermined interval within a range of not being significantly affected by the acoustic noise.

The insulating layer 140 may contain an organic resin, ceramic, an inorganic filler, glass, or a mixture thereof, but is not limited thereto.

According to the embodiment of the invention, the above-mentioned shapes of the internal electrodes, the external electrodes, and the insulating layer may be freely combined.

According to the embodiment of the invention, the contraction and expansion of the dielectric layers may complementarily occur by alternately disposing the first and second internal electrodes groups, such that influence of expansion and contraction of the ceramic body may offset each other, thereby decreasing the acoustic noise.

Further, the external electrodes may be formed on the same surface of the ceramic body to thereby improving the mounting density, and the internal electrodes may be horizontally mounted on the mounting surface due to extension of the external electrodes, thereby further decreasing the acoustic noise.

Particularly, in the multilayer ceramic capacitor according to the embodiment of the invention, since the external electrodes are exposed to the main surface of the ceramic body, and portions of the external electrodes formed on the side surface are covered by the insulating layer, when the multilayer ceramic capacitor is mounted on the board using the main surface of the ceramic body as the mounting surface, the solder may not move up along the side and end surfaces of the multilayer ceramic capacitor. As the amount of solder moving up along the side and end surfaces of the multilayer ceramic capacitor is increased, the acoustic noise is increased. Therefore, in the case in which the solder does not move up along the side and end surfaces of the multilayer ceramic capacitor as in the embodiment of the invention, the acoustic noise may be more efficiently decreased.

Board for Mounting Multilayer Ceramic Capacitor

According to another embodiment of the invention, there is provided a board for mounting a multilayer ceramic capacitor, the board including: a printed circuit board 210 having first and second electrode pads 221 and 222 formed thereon; and a multilayer ceramic capacitor 100 mounted on the printed circuit board, wherein the multilayer ceramic capacitor includes: a ceramic body 110 including dielectric layers 111 and having first and second main surfaces 5 and 6 facing each other in a thickness direction thereof, first and second end surfaces 3 and 4 facing each other in a length direction thereof, and first and second side surfaces 1 and 2 facing each other in a width direction thereof; first and second internal electrode groups I and II disposed to be misaligned by a predetermined interval in the length direction, having the dielectric layers 111 interposed therebetween; first and second external electrodes 131 and 132 extended from at least one of first and second side surfaces of the ceramic body to at least one of the first and second main surfaces; and an insulating layer 140 covering portions of the first and second external electrodes formed on the at least one of the first and second side surfaces, the first internal electrode group including a first internal electrode 121 including a first pattern part 121a and a first lead part 121b connected to the first external electrode 131 and a second internal electrode 122 including a second pattern part 122a and a second lead part 122b connected to the second external electrode 132, and the second internal electrode group including a third internal electrode 123 including a third pattern part 123a and a third lead part 123b connected to the first external electrode 131 and a fourth internal electrode 124 including a fourth pattern part 124a and a fourth lead part 124b connected to the second external electrode 132.

Figure 7:
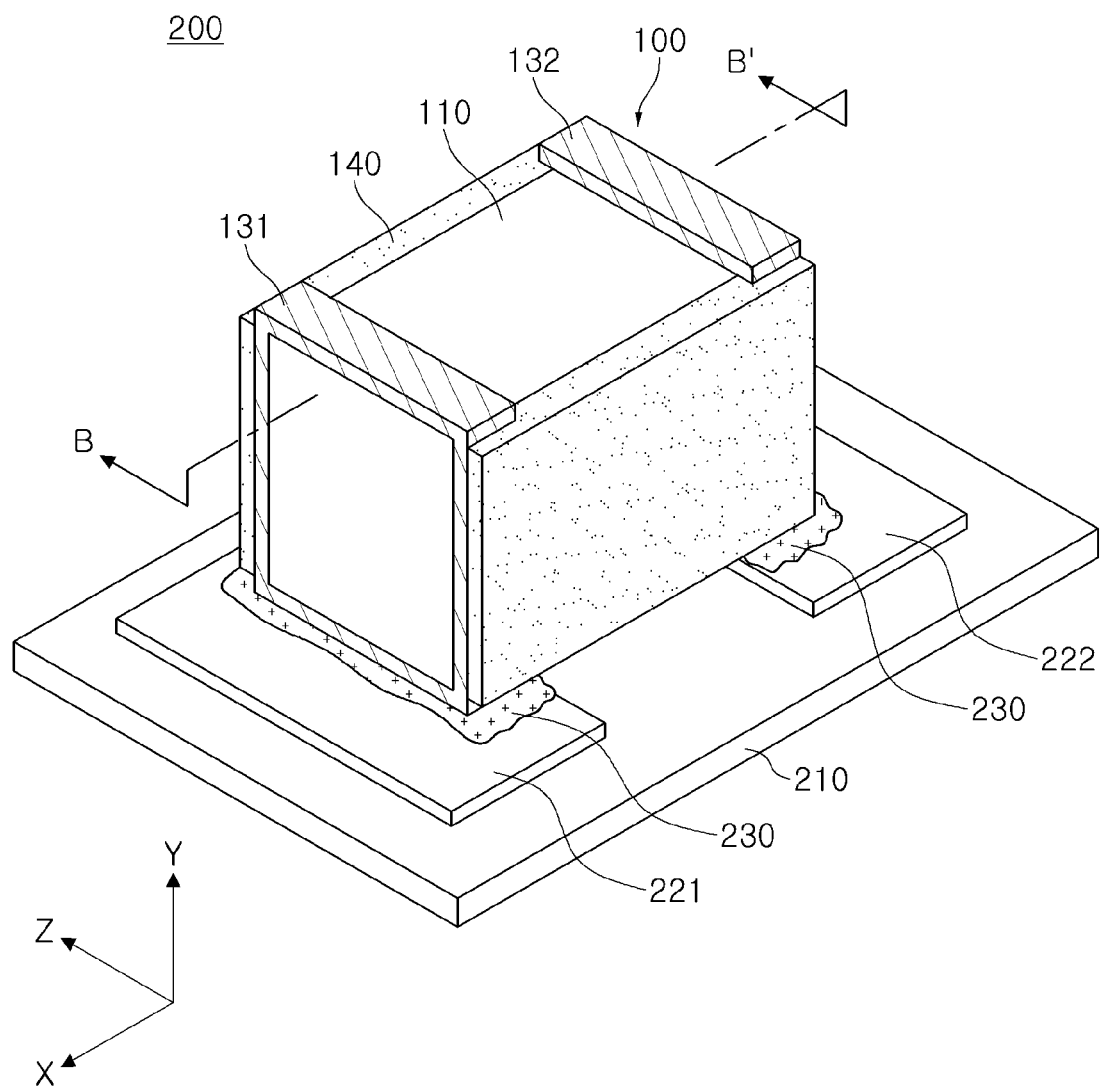
FIG. 7 is a schematic perspective view showing a board for mounting a multilayer ceramic capacitor according to another embodiment of the present invention.
Figure 8:
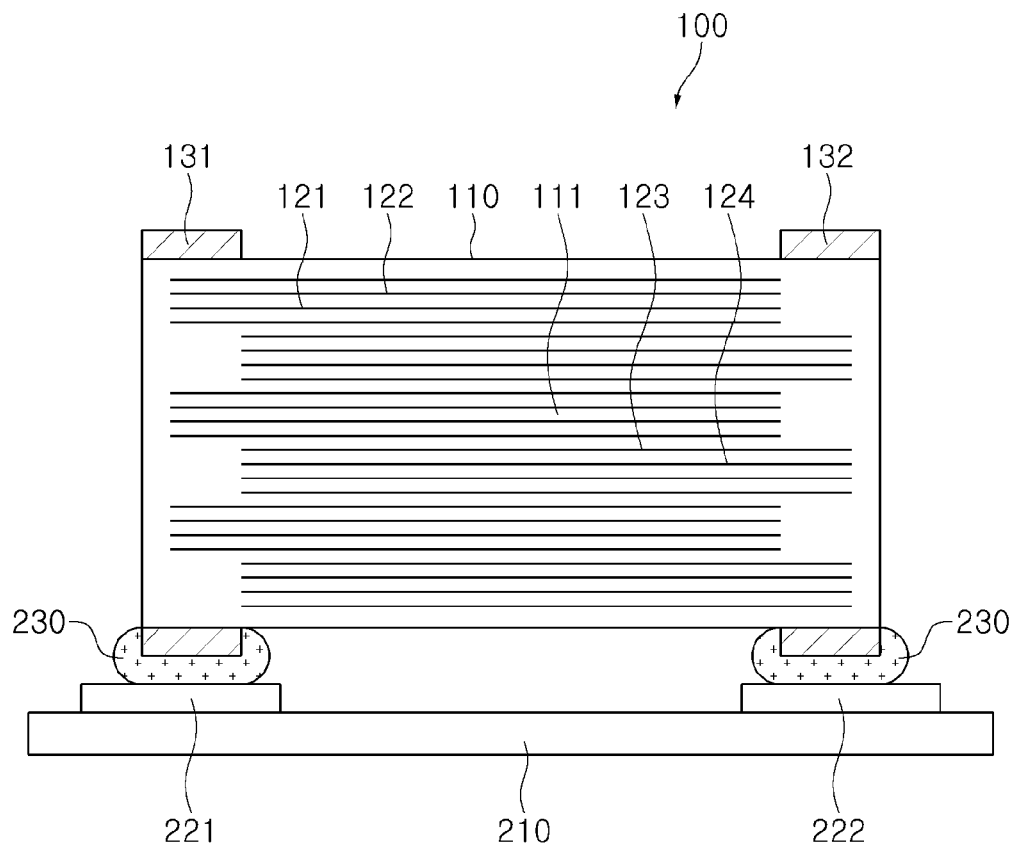
FIG. 8 is a cross-sectional view of the board for mounting a multilayer ceramic capacitor of FIG. 7, taken along line B-B'.

FIG. 7 is a perspective view showing a board having a multilayer ceramic capacitor mounted thereon according to an embodiment of the present invention, and FIG. 8 is a cross-sectional view showing the board for mounting the multilayer ceramic capacitor of FIG. 7 taken along line B-B'.

Referring to FIGS. 7 and 8, aboard 200 for mounting the multilayer ceramic capacitor 100 according to the embodiment of the invention may include the printed circuit board 210 on which the multilayer ceramic capacitor 100 is mounted and the first and second electrode pads 221 and 222 formed on the printed circuit board 210 to be spaced apart from each other.

In this case, the multilayer ceramic capacitor 100 may be electrically connected to the printed circuit board 210 by a solder 230 in a state in which the first and second external electrodes 131 and 132 extended to at least one of the first and second main surfaces are positioned to contact the first and second electrode pads 221 and 222, respectively.

In the present embodiment, since a description of the multilayer ceramic capacitor 100 mounted on the printed circuit board 210 is overlapped with the description of the above-mentioned multilayer ceramic capacitor, a detailed description thereof will be omitted.

As set forth above, according to embodiments of the invention, a high capacitance multilayer ceramic capacitor having internal electrodes horizontally mounted therein and improved mounting density, and a board for mounting the same may be provided.

According to embodiments of the invention, a multilayer ceramic capacitor allowing for a significant reduction in acoustic noise, and a board for mounting the same may be provided.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic capacitor comprising:
   a ceramic body including dielectric layers and having first and second main surfaces facing each other in a thickness direction thereof, first and second end surfaces facing each other in a length direction thereof, and first and second side surfaces facing each other in a width direction thereof;
   first and second internal electrode groups having the dielectric layers interposed therebetween;
   first and second external electrodes extended from at least one of the first and second side surfaces of the ceramic body to at least one of the first and second main surfaces thereof; and
   an insulating layer covering portions of the first and second external electrodes formed on the at least one of the first and second side surfaces,
   wherein the first internal electrode group includes a first internal electrode including a first pattern part and a first lead part connected to the first external electrode and a second internal electrode including a second pattern part and a second lead part connected to the second external electrode,
   the second internal electrode group includes a third internal electrode including a third pattern part and a third lead part connected to the first external electrode and a fourth internal electrode including a fourth pattern part and a fourth lead part connected to the second external electrode,
   the first internal electrode group is disposed closer to the first end surface of the ceramic body than the second internal electrode group,
   the second internal electrode group is disposed closer to the second end surface of the ceramic body than the first internal electrode group,
   the first internal electrode group is disposed to be spaced apart from the second end surface of the ceramic body in the length direction, and
   the second internal electrode group is disposed to be spaced apart from the first end surface of the ceramic body in the length direction.

2. The multilayer ceramic capacitor of claim 1, wherein portions of the first and third lead parts connected to the first external electrode are aligned with each other.

3. The multilayer ceramic capacitor of claim 1, wherein portions of the second and fourth lead parts connected to the second external electrode are aligned with each other.

4. The multilayer ceramic capacitor of claim 1, wherein the second lead part is disposed obliquely to the second pattern part.

5. The multilayer ceramic capacitor of claim 1, wherein the third lead part is disposed obliquely to the third pattern part.

6. The multilayer ceramic capacitor of claim 1, wherein the first and second external electrodes are extended from the first side surface to any one of the first and second main surfaces.

7. The multilayer ceramic capacitor of claim 1, wherein the first and second external electrodes are extended from the first side surface to the first and second main surfaces.

8. The multilayer ceramic capacitor of claim 1, wherein the first and second external electrodes are extended from the first side surface to any one of the first and second main surfaces, and the second side surface.

9. The multilayer ceramic capacitor of claim 1, wherein the first and second external electrodes are extended from the first side surface to the first and second main surfaces and the second side surface.

10. The multilayer ceramic capacitor of claim 1, wherein the first external electrode is extended from the first side surface to the first main surface, and
    the second external electrode is extended from the second side surface to the first main surface.

11. The multilayer ceramic capacitor of claim 1, wherein the first and second external electrodes are disposed to contact the first and second end surfaces.

12. The multilayer ceramic capacitor of claim 1, wherein the first and second external electrodes are spaced apart from the first and second end surfaces by a predetermined interval.

13. The multilayer ceramic capacitor of claim 1, wherein the insulating layer includes an organic resin, ceramic, an inorganic filler, glass, or a mixture thereof.

14. The multilayer ceramic capacitor of claim 1, wherein the first and second internal electrodes are disposed horizontally to a mounting surface of the ceramic body.

15. The multilayer ceramic capacitor of claim 1, wherein the dielectric layers have an average thickness of 0.1 µm to 2.0 µm.

16. The multilayer ceramic capacitor of claim 1, wherein the first and second internal electrodes have a thickness of 1.5 µm or less.

17. A board for mounting a multilayer ceramic capacitor, the board comprising:
- a printed circuit board having first and second electrode pads formed thereon; and
- a multilayer ceramic capacitor mounted on the printed circuit board, wherein the multilayer ceramic capacitor includes:
a ceramic body including dielectric layers and having first and second main surfaces facing each other in a thickness direction thereof, first and second end surfaces facing each other in a length direction thereof, and first and second side surfaces facing each other in a width direction thereof;
first and second internal electrode groups having the dielectric layers interposed therebetween;
first and second external electrodes extended from at least one of the first and second side surfaces of the ceramic body to at least one of the first and second main surfaces; and
an insulating layer covering portions of the first and second external electrodes formed on the at least one of the first and second side surfaces,
the first internal electrode group including a first internal electrode including a first pattern part and a first lead part connected to the first external electrode and a second internal electrode including a second pattern part and a second lead part connected to the second external electrode,
the second internal electrode group including a third internal electrode including a third pattern part and a third lead part connected to the first external electrode and a fourth internal electrode including a fourth pattern part and a fourth lead part connected to the second external electrode,
the first internal electrode group is disposed closer to the first end surface of the ceramic body than the second internal electrode group,
the second internal electrode group is disposed closer to the second end surface of the ceramic body than the first internal electrode group,
the first internal electrode group is disposed to be spaced apart from the second end surface of the ceramic body in the length direction, and
the second internal electrode group is disposed to be spaced apart from the first end surface of the ceramic body in the length direction.

18. The board of claim 17, wherein one of the first and second main surfaces to which the first and second external electrodes are extended serves as a mounting surface facing the printed circuit board.

19. The board of claim 17, wherein portions of the first and third lead parts connected to the first external electrode are aligned with each other.

20. The board of claim 17, wherein portions of the second and fourth lead parts connected to the second external electrode are aligned with each other.

21. The board of claim 17, wherein the second lead part is disposed obliquely to the second pattern part.

22. The board of claim 17, wherein the third lead part is disposed obliquely to the third pattern part.

23. The multilayer ceramic capacitor of claim 1, wherein the first and second internal electrode groups are disposed to be spaced apart from the first and second end surfaces of the ceramic body in the length direction.

24. The board of claim 17, wherein the first and second internal electrode groups are disposed to be spaced apart from the first and second end surfaces of the ceramic body in the length direction.

* * * * *